United States Patent

Oh et al.

[11] Patent Number: 5,917,567
[45] Date of Patent: *Jun. 29, 1999

[54] METHOD OF MANUFACTURING A REFLECTOR COMPRISING STEPS FORMING BEADS AND POLYMER LAYER SEPARATELY

[75] Inventors: Young Jin Oh, Namyangju; Yong Beom Kim, Kunpo; Jeong Min Moon, Anyang, all of Rep. of Korea

[73] Assignee: LG Electronics Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/943,417

[22] Filed: Sep. 30, 1997

[30] Foreign Application Priority Data

May 22, 1997 [KR] Rep. of Korea ............... 97-19914

[51] Int. Cl.$^6$ ............... G02F 1/1335; G02F 1/1339; B32B 5/16
[52] U.S. Cl. ............... 349/113; 349/155; 428/323
[58] Field of Search ............... 349/113, 155; 428/323

[56] References Cited

U.S. PATENT DOCUMENTS

| | | | |
|---|---|---|---|
| 4,341,445 | 7/1982 | Matsuyama et al. | 349/155 |
| 4,519,678 | 5/1985 | Komatsubara et al. | 349/113 |
| 4,648,691 | 3/1987 | Oguchi et al. | 349/113 |
| 5,245,454 | 9/1993 | Blonder | 349/113 |
| 5,408,345 | 4/1995 | Mitsui et al. | 349/113 |
| 5,418,635 | 5/1995 | Mitsui et al. | 349/113 |
| 5,526,149 | 6/1996 | Kanbe et al. | 349/113 |
| 5,610,741 | 3/1997 | Kimura | 349/113 |
| 5,680,188 | 10/1997 | Yoshida et al. | 349/113 |
| 5,684,551 | 11/1997 | Nakamura et al. | 349/113 |
| 5,691,791 | 11/1997 | Nakamura et al. | 349/113 |
| 5,714,247 | 2/1998 | Kuo et al. | 349/113 |

FOREIGN PATENT DOCUMENTS 7-110476  4/1995  Japan .

*Primary Examiner*—William L. Sikes
*Assistant Examiner*—Toan Ton
*Attorney, Agent, or Firm*—Finnegan, Henderson, Farabow, Garrett & Dunner, L.L.P.

[57] ABSTRACT

A method of manufacturing a reflector in a liquid crystal display device comprising forming a thin layer of a solution of beads and polymer on the substrate, and forming a reflective layer on the thin layer.

8 Claims, 5 Drawing Sheets

METHOD OF MANUFACTURING A REFLECTOR COMPRISING STEPS FORMING BEADS AND POLYMER LAYER SEPARATELY

BACKGROUND OF THE INVENTION

This invention relates to a liquid crystal display device, and more particularly to a reflective-type liquid crystal display device having a reflector on which a plurality of convex portions are formed and a method of manufacturing the reflector. Such liquid crystal display devices (hereinafter LCDs) using a reflector on which a plurality of convex portions are formed increase the viewing angle characteristic.

FIG. 1 is a schematic sectional view of a traditional reflective-type LCD having a rough reflector with Guest-Host driving mode. The LCD includes first and second substrates 11 and 12, a liquid crystal layer 13, a color filter layer 14 between the first and second substrates, a plurality of convex portions made of a photosensitive resin 15 formed on the second substrate 12, a pixel electrode 16 functioning as a reflector and formed on the convex portions, and a counter electrode (not illustrated) made of a transparent material such as Indium Tin Oxide (ITO) formed between the liquid crystal layer 13 and the first substrate 11.

FIGS. 2a–f represent a method of manufacturing the reflector of FIG. 1. The method includes the steps of first forming a photoresist layer 17 by spin coating photosensitive resin on substrate 12 as shown in FIG. 2a. Photoresist layer 17 is then exposed with ultraviolet light (indicated by arrows) from the upper side while blocking photoresist layer 17 with a mask 18 having a plurality of holes A and B as shown in FIG. 2b. Thereby, a plurality of convex portions, in which each convex portion has a size different from that of the neighboring convex portion, are formed on the second substrate 12 as shown in FIG. 2c. The convex portions are thermally treated so that the height of the convex portions is different as shown in FIG. 2d. Next, an over-coating layer 19 is formed by spin coating polymer resin as shown in FIG. 2e. Finally, a pixel electrode 16 is formed by sputtering Al, Ag, or the like as shown in FIG. 2f.

Referring again to FIG. 1, we describe the movement of the reflective-type LCD having a rough reflector with Guest-Host driving mode. When a voltage is not applied to the device, as shown in state I, the light is blocked by dichromatic dyes within the liquid crystal layer 13, and the device is thereby darkened. When a voltage is applied to the device, as shown in state II, the light through the first substrate 11 is reflected on the pixel electrode 16 after passing through the color filter layer 14 and liquid crystal layer 13. When reflected, the light is also diffused from the surface of the reflector, which has a fine geometrical structure, so that the reflected light is brighter than the original light that passed through the liquid crystal layer 13, the color filter layer 14 and the first substrate 11. As a result, the viewing angle and brightness are increased.

In LCDs, however, the process for making a plurality of convex portions requires one or two complex photolithography steps corresponding to the convex portion size, and the result of the process may be unstable. Further, an electric field between the pixel electrode and the counter electrode is distorted by multiform of the liquid crystal arrangement. As a result, it is impossible to provide a correct image to user despite of the increase in viewing angle and brightness.

SUMMARY OF THE INVENTION

It is an object of the present invention to provide a reflector having excellent diffusion characteristics in which the surface of the reflector is formed with a plurality of convex portions by uniformly depositing fine spacers.

It is another object of the present invention to provide an LCD by using the reflector, wherein the LCD has both a wide viewing angle and high brightness by preserving it from liquid crystal arrangement distortion and over-diffusion.

In order to achieve these and other objects, a method of manufacturing a reflector in a reflective-type liquid crystal display device includes providing a substrate, forming a thin layer of a solution of beads and polymer on the substrate, and forming a reflective layer on the thin layer.

According to another aspect of the present invention, a method of manufacturing a reflector in a reflective-type liquid crystal display device includes providing a substrate, depositing a plurality of beads on the substrate, forming a polymer layer over the substrate and the beads, the polymer layer covering the beads, and forming a reflective layer on the thin layer.

According to yet another aspect of the present invention, a reflective-type liquid crystal display device includes a first substrate, a second substrate, a liquid crystal layer between the first and second substrates, a thin layer of polymer and beads formed on the first substrate, the polymer covering the beads, and a reflective layer formed on the thin layer.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with a description, serve to explain the principles of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

Figure 1:
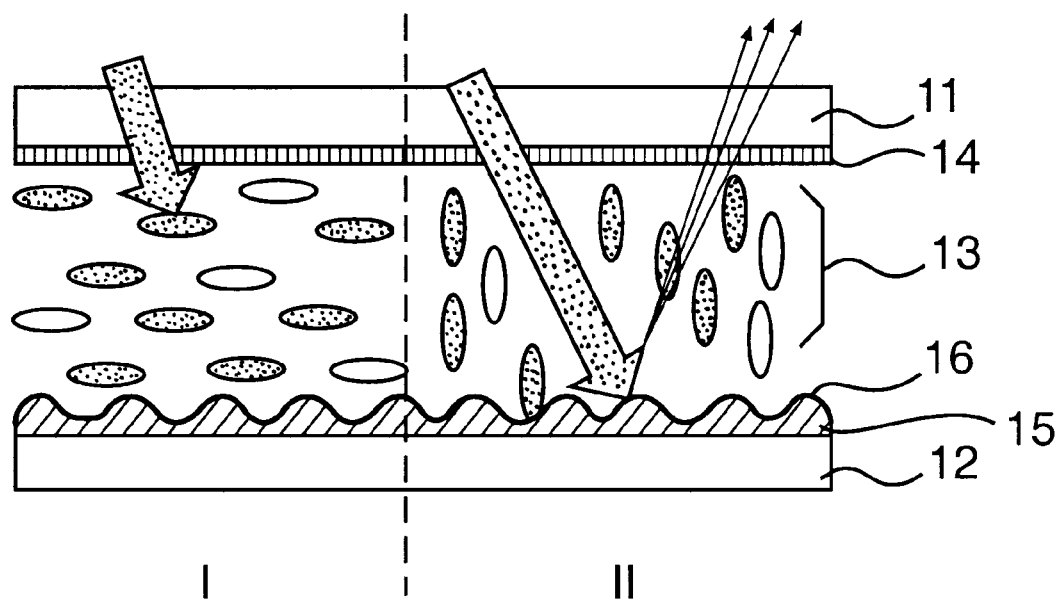
FIG. 1 is a schematic sectional view of a traditional reflective-type liquid crystal display device having a rough reflector with Guest-Host driving mode.
Figure 2A:
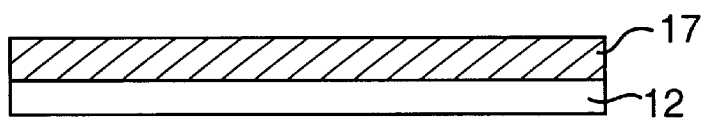
FIGS. 2a–f show a method of manufacturing the reflector of FIG. 1.
Figure 2A:
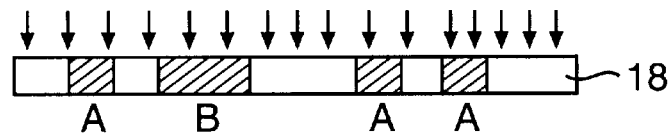
Figure 2B:
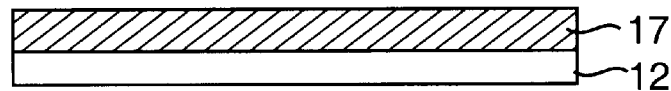
Figure 2C:
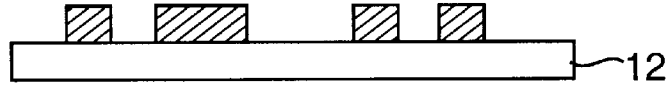
Figure 2D:
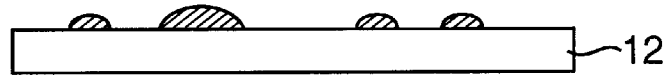
Figure 2E:
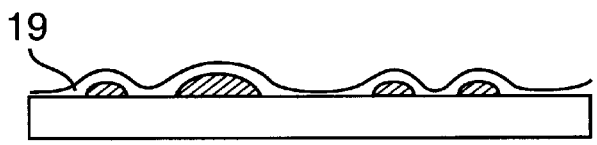
Figure 2F:
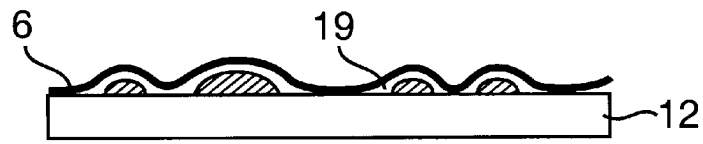
Figure 3A:
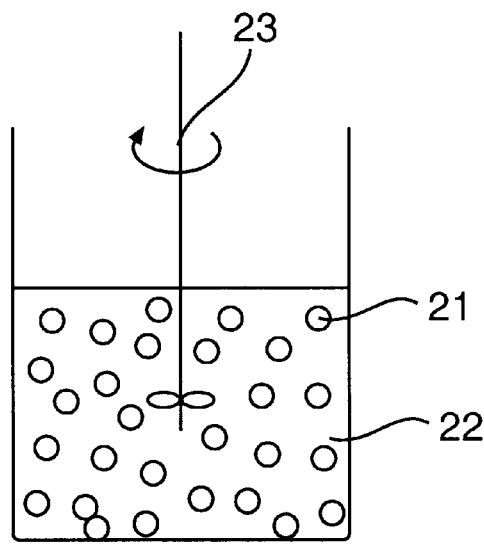
FIGS. 3a–c show a first embodiment in accordance with the present invention.
Figure 3B:
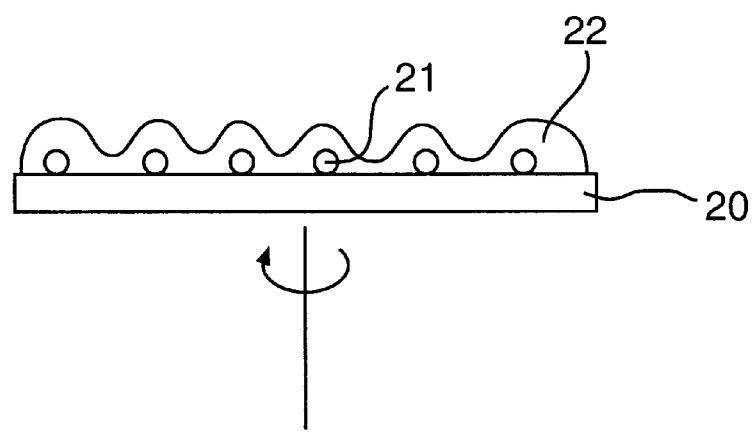
Figure 3C:
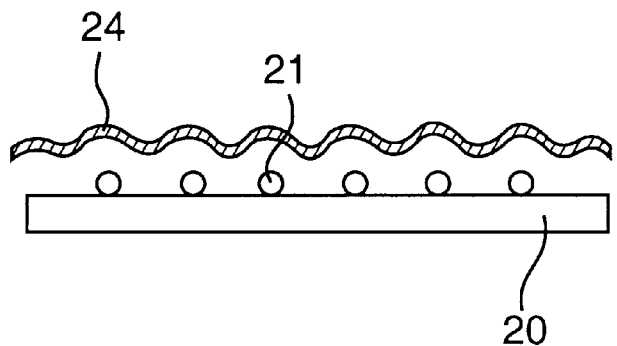

FIGS. 3a–c represent a method of manufacturing the reflector according to the present invention. As shown in FIG. 3a, a plurality of spacers 21 especially adhesive spacers, and a polymer solution 22 are sufficiently mixed with stirrer 23. As shown in FIG. 3b, a thin layer of the mixture is formed by spin coating. After depositing the spacers 21 and the polymer solution 22 on the substrate 20, the thin layer is cured to form a rough surface. The pixel electrode 24, made of a high reflective index metal such as Al or Ag, is formed by sputtering on the cured thin layer.

Figure 4A:
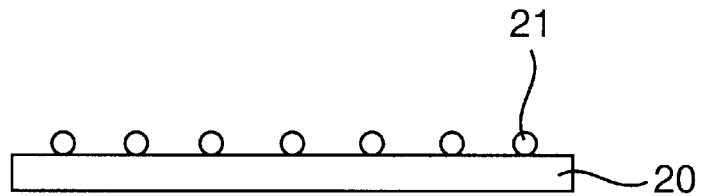
FIGS. 4a–c show a second embodiment in accordance with the present invention.
Figure 4B:
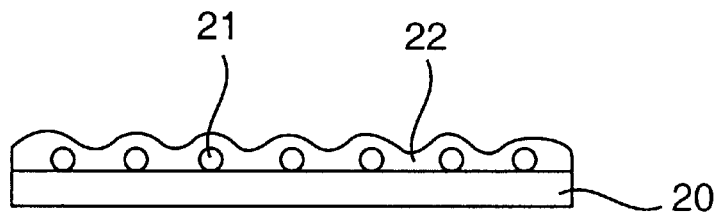
Figure 4C:
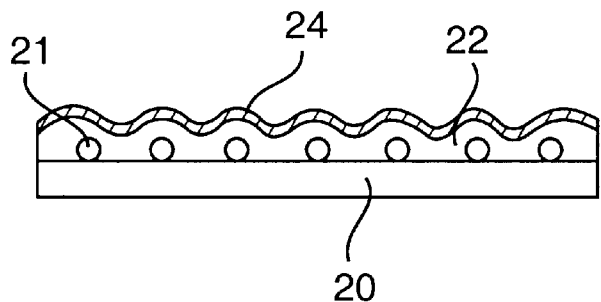

FIGS. 4a–c represent another method of manufacturing the reflector of the LCD according to the present invention. As shown in FIG. 4a, spacers 21, especially adhesive spacers, are deposited on substrate 20. The polymer solution 22, which polymer is cross-linked, is then distributed on the spacers preferably by spin coating or roll coating as shown in FIG. 4b. The thin layer is cured to form a rough surface corresponding the spacer size. Further, as shown in FIG. 4c, the pixel electrode 24, made of a high reflective index metal such as Al or Ag, is formed on the thin layer of polymer solution 22 by sputtering.

To achieve an effect of interference setoff, the diameters of the spacers are preferably 0.1–3 um, the density of the spacers is preferably 0.6–1.2d, and the thickness of the over-coating layer is 1–2.5 um. Although not shown, if each convex portion has a different size from that of the neighboring convex portion, the effect of interference setoff can be achieved.

Figure 5:
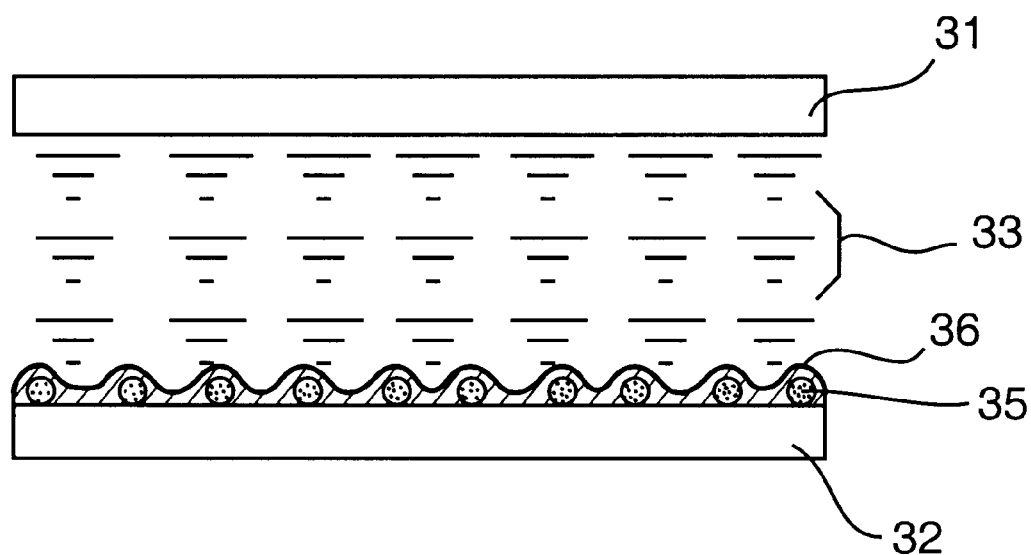
FIG. 5 is a schematic sectional view of reflective-type liquid crystal display device having a reflector in accordance with the present invention.

FIG. 5 is a schematic sectional view of a reflective-type LCD having a reflector in accordance with the present invention. A liquid crystal layer is formed between the first and second substrates 31 and 32, and the reflector 36 is formed on the second substrate 32, in which the reflector 36, made of Al or Ag, is formed over a plurality of spacers 35.

Since the reflector according to the present invention uses a plurality of spacers, it is possible to provide a reflector having a wide viewing angle and high brightness by a simple process as compared with the traditional LCD having the reflector manufactured by a complex process. Further, the LCD according to the present invention has a wide viewing angle and high brightness by preserving it from liquid crystal arrangement distortion and over-diffusion.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of manufacturing a reflector in a reflective-type liquid crystal display device, comprising:

providing a substrate;

depositing a plurality of beads on the substrate;

forming a polymer layer over the substrate and the beads, the polymer layer covering the beads; and forming a reflective layer on the thin layer.

2. The method according to claim 1, wherein a diameter of the beads is 0.1–3 um.

3. The method according to claim 1, wherein each bead has a different size from that of a neighboring bead.

4. The method according to claim 1, wherein the thin layer is formed by spin coating.

5. The method according to claim 1, wherein the reflective layer is metal.

6. The method according to claim 5, wherein the metal includes Al or Ag.

7. The method according to claim 1, wherein the beads are adhesive.

8. The method according to claim 1, wherein said forming the thin layer includes curing the thin layer.

* * * * *